US008177459B2

(12) United States Patent
Hughes et al.

(10) Patent No.: US 8,177,459 B2
(45) Date of Patent: May 15, 2012

(54) BALL NOSE END MILL AND INSERT

(75) Inventors: Donald R. Hughes, Meadville, PA (US); Travis J. Biggs, Cochranton, PA (US)

(73) Assignee: Greenleaf Technology Corporation, Coronado, CA (US)

( * ) Notice: Subject to any disclaimer, the term of this patent is extended or adjusted under 35 U.S.C. 154(b) by 746 days.

(21) Appl. No.: 12/313,998

(22) Filed: Nov. 26, 2008

(65) Prior Publication Data
US 2010/0129165 A1   May 27, 2010

(51) Int. Cl.
B23C 5/22 (2006.01)
B23B 27/22 (2006.01)
(52) U.S. Cl. .................................... 407/40; 407/113
(58) Field of Classification Search .......... 407/40, 407/42, 33, 53, 54, 48, 113; 408/227, 231, 408/233
See application file for complete search history.

(56) References Cited

U.S. PATENT DOCUMENTS

| 4,120,601 | A |   | 10/1978 | Benjamin |          |
|-----------|---|---|---------|----------|----------|
| 4,251,172 | A | * | 2/1981  | Durand   | 408/228  |
| 4,961,757 | A |   | 10/1990 | Rhodes et al. |     |
| 5,108,234 | A | * | 4/1992  | Stojanovski | 407/40 |
| 5,348,426 | A |   | 9/1994  | Krupp    |          |
| 5,632,576 | A |   | 5/1997  | Storch   |          |
| 5,782,589 | A | * | 7/1998  | Cole     | 408/233  |
| 5,955,390 | A |   | 9/1999  | Mehrotra et al. |   |
| 6,158,927 | A | * | 12/2000 | Cole et al. | 407/48 |
| 6,231,275 | B1 |  | 5/2001  | Kunimori et al. |   |
| 6,582,165 | B1 | * | 6/2003 | Baba     | 408/233  |
| 6,607,333 | B2 |  | 8/2003  | Satran et al. |     |
| 7,044,695 | B2 |  | 5/2006  | Stojanovski |       |
| 7,226,249 | B2 | * | 6/2007 | Tsuchitani et al. | 407/42 |
| 7,740,427 | B2 | * | 6/2010 | Heule et al. | 408/233 |

OTHER PUBLICATIONS

"CoroMill® 216F Ball Nose Endmill", printed from www.coromant.sandvik.com, last updated Nov. 16, 2007 (p. 1) and Oct. 1, 2007 (p. 2).
International Search Report and Written Opinion mailed Sep. 1, 2009 in corresponding International Application No. PCT/US2009/050413.
International Preliminary Report on Patentability, dated May 31, 2011, issued in International Application No. PCT/US2009/050413, which corresponds to U.S. Appl. No. 12/313,998.

* cited by examiner

Primary Examiner — Will Fridie, Jr.
(74) Attorney, Agent, or Firm — K&L Gates LLP

(57) ABSTRACT

A cutting insert for a ball nose end mill includes a body including two opposed substantially flat retention surfaces. Each retention surface includes a chip control groove thereon extending from a point at or near an axial center of the body at an angle relative to the axial center of the body. The insert further includes a peripheral surface joining the two retention surfaces, wherein the peripheral surface includes a locating surface at a first end thereof and two arcuate surfaces at an opposed, second end thereof extending rearwardly from approximately the axial center of the second end and positioned on opposite sides of the insert symmetrically with respect to the centerline of the insert. The arcuate surfaces each including an arcuate cutting edge at the intersection of outer portion of a chip control groove and the arcuate surface. The arcuate surfaces are formed with a face clearance angle under the cutting edges.

56 Claims, 7 Drawing Sheets

BALL NOSE END MILL AND INSERT

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention is directed to cutting tools and cutting inserts. More particularly, the present invention is directed to ball nose end mills with replaceable cutting inserts.

2. Description of the Invention Background

Most manufactured products contain one or more components manufactured by machining, and often the machining step or steps produce the components to very precise tolerances. Machining, while one of the most basic and important processes used in manufacturing metal products, also is one of the more expensive. Thus, even modest improvements in the machining process may yield substantial cost savings.

One of the basic machining processes is milling. In milling, a form is generated in a workpiece by the action of a rotating cutting tool on the workpiece. End milling is a particular type of milling that normally involves the use of a relatively small diameter cutting tool with one or more cutting edges at its end. Ball nose end milling is a particular type of end milling that uses a cutter with a radiused or arcuate cutting edge at the end of the cutter. Ball nose end milling cutters, commonly called "ball nose end mills", are ideal for machining 3-dimensional forms in molds and dies and for providing a radiused or arcuate form in the workpiece. Ball nose end mills may be solid with cutting edges ground in the surface or be constructed to use replaceable cutting inserts. The present invention relates to ball nose end mills that use replaceable cutting inserts. It is particularly useful when applied to end mills of that type that have an effective cutting diameter in the range of ⅜" to 1.0". As in other machining processes, the design of the cutting tool is critical to the efficiency by which material can be removed from the workpiece. Thus, substantial sums are spent each year to research and develop improved cutting tools for machining.

Ball nose end mills typically have several disadvantages due to the fact that during the machining operation the cutting speed changes along the cutting edge and is zero at the axial center of the tool. This normally results in premature wear and dulling, chipping or breaking of the cutting edge which shortens the useful life of the tool. Prior design tools typically use a cemented carbide replaceable insert that needs to be replaced frequently due to excessive wear or breakage. It has generally been thought that ceramic could not be used as an insert material for ball nose end milling because ceramic must be run at a high surface feed rate to generate the heat required to plasticize the metal being cut during the machining operation. The slow cutting speeds toward the axial center of a ball nose end mill and the zero cutting speed at the center of the tool were thought to be insufficient to generate the required heat. And the brittleness of ceramic was thought to make it more susceptible to edge chipping and cracking during a ball nose end milling operation.

In a typical prior art ball nose end mill, an insert with a radiused or arcuate cutting edge is retained in an axial slot at the end of a cylindrical cutting tool body. The cutting tool insert may be held in place by a number of different means including a screw which draws the sides of the slot together, a clamp or brazing. Examples of prior art ball nose end mills that use replaceable inserts are shown in U.S. Pat. Nos. 5,782,589, 6,158,927, 7,044,695, 5,632,576, 6,231,275, 6,607,333, and U.S. Pat. No. 5,348,426. The present invention is a significant improvement over the prior art in that it allows the use of ceramic inserts in ball nose end milling with effective use of cutting edges to the axial center of the end mill. It also provides improved performance and longer tool life.

The use of ceramic inserts is particularly advantageous because ceramic generally has high hardness and is relatively resistant to oxidation and, therefore, it will exhibit low tool wear at high cutting temperatures. The faster the cutting speeds, the higher the cutting temperature. The properties of ceramics allow ceramic cutting tools to be run at faster cutting speeds while maintaining long tool life, thereby improving the efficiency of the machining process.

SUMMARY OF THE INVENTION

According to one aspect, the present invention provides a unique cutting insert for a ball nose end mill comprising a body including two opposed substantially flat retention surfaces. Each retention surface includes a chip control groove thereon extending from a point at or near an axial center of the body at an angle relative to the axial center of the body. The insert further includes a peripheral surface joining the two retention surfaces, wherein the peripheral surface includes a locating surface at a first end thereof and two arcuate surfaces at an opposed, second end thereof. The arcuate surfaces extend rearwardly from approximately the axial center of the second end and are positioned on opposite sides of the insert symmetrically with respect to the centerline of the insert. The arcuate surfaces each include an arcuate cutting edge at the intersection of the outer portion of each chip control groove and the arcuate surface, the arcuate surfaces being formed with a face clearance angle under the cutting edges.

In certain non-limiting embodiments of the cutting insert according to the present disclosure, the face clearance angle progressively increases in a direction toward the axial center of the second. For example, the clearance angle may increase from an angle in the range of 2° to 10° to an angle in the range of 5° to 20°, or from an angle of 6.5° to an angle of 10° for a 0.5" diameter end mill.

According to another aspect, the present invention provides a unique ball nose end mill for material removal, wherein the end mill includes a cylindrical tool body and a cutting insert mounted securely to the tool body. The tool body includes an axially positioned slot in one end of the tool body, wherein the slot includes a locating surface to accurately position a cutting insert mounted in the slot relative to an axial centerline of the tool body. The tool body further includes a fastener for attaching the cutting insert in the slot in a desired position relative to the axial centerline of the tool body. The cutting insert includes a body including two opposed substantially flat retention surfaces, each retention surface including a chip control groove thereon extending from a point at or near an axial center of the body at an angle relative to the axial center of the body. The insert further includes a peripheral surface joining the two retention surfaces, wherein the peripheral surface includes a locating surface at a first end thereof and two arcuate surfaces at an opposed, second end thereof. The arcuate surfaces extend rearwardly from approximately the axial center of the second end and are positioned on opposite sides of the insert symmetrically with respect to the centerline of the insert. The arcuate surfaces each include an arcuate cutting edge at the intersection of the outer portion of each chip control groove and the arcuate surface, the arcuate surfaces being formed with a face clearance angle under the cutting edges.

In certain non-limiting embodiments of the ball nose end mill according to the present disclosure, the clearance angle of the cutting insert progressively increases in a direction toward the axial center of second end. For example, the clearance angle may increase from an angle in the range of 2° to 10° to an angle in the range of 5° to 20°, or from an angle of 6.5° to an angle of 10° for a 0.5" diameter end mill.

BRIEF DESCRIPTION OF THE DRAWINGS

The advantages of the present invention may be better understood by reference to the drawings in which.

DETAILED DESCRIPTION OF THE INVENTION

Figure 1:
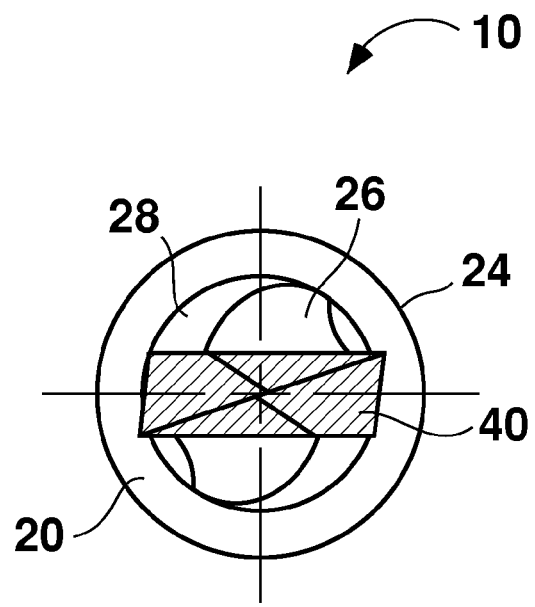
FIG. 1 is a top view of an embodiment of a ball nose end mill constructed according to the present invention.
Figure 2:
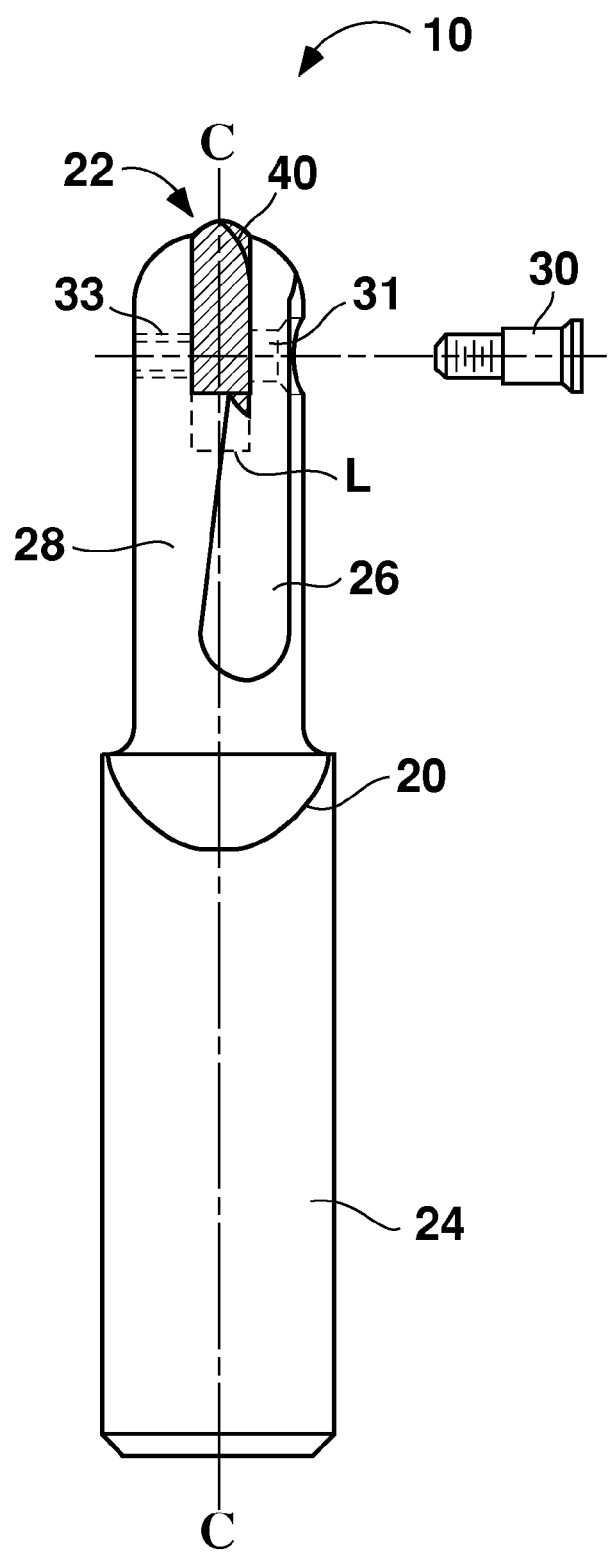
FIG. 2 is a semi-transparent side view of the embodiment of a ball nose end mill shown in FIG. 1 with the retention screw shown in outside the end mill.
Figure 3:
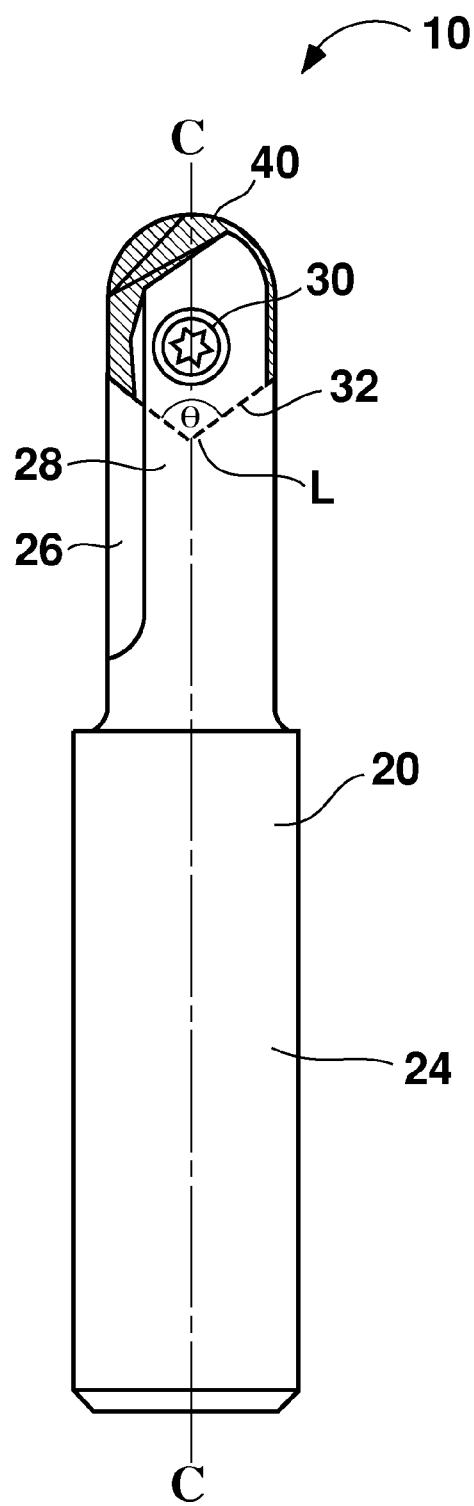
FIG. 3 is a semi-transparent front view of the embodiment of a ball nose end mill shown in FIG. 1.

The present invention provides an improved ball nose end mill that uses a novel replaceable cutting insert. The improved ball nose end mill of the present invention can be best understood by reference to the non-limiting embodiment shown in FIGS. 1 through 11. FIGS. 1 through 3 show a ball nose end mill 10 of the present invention that comprises a cylindrical tool holder 20 and a replaceable cutting tool insert 40 retained in an axial slot 22 at one end of tool holder 20. The rearward portion 24 of tool holder 20 typically has a larger diameter that is adapted to be mounted in the spindle of a machine tool where it is rotatably driven about the longitudinal axis. Chip flow gullets 26 may be provided axially on opposing sides in the outer surface of the forward portion 28 of the tool holder 20. A threaded screw 30 extends through a hole 31 in the tool holder 20 on one side of the slot 22, through a hole in the insert 40 and into a threaded hole 33 on the other side of the tool holder slot 22 to secure the insert 40 in the tool holder 20 by drawing the opposite sides of the forward portion 28 defining the slot 22 together in a manner that is well known in the art.

The bottom of the slot 22 has a substantially V-shaped locating surface 32 (indicated by dotted lines in FIG. 3) positioned with the line "L" (see FIG. 2) forming the lowest region of the V-shaped surface intersecting the axial centerline "C" of the tool holder 20. With reference to FIG. 3, the angle Ø between the intersecting sides of the V-shaped axial locating surface 32 is preferably about 110°. As seen in FIG. 2, the locating surface 32 is preferably perpendicular to the axial centerline "C" of the tool holder 20. The axial locating surface 32 is constructed to allow precise location of the insert 40 axially and relative to the axial centerline "C" on the forward end 28 of the tool holder 20.

V-shaped locating surface 32 may include two surfaces extending at an angle to one another from a centrally located flat surface.

Locating surface 32 may have other shapes, such as an inverted V shape, which act in conjunction with a complimentary shaped surface on the insert to accurately position the cutting insert relative to the axial center of the tool holder. The end of forward portion 28 of the tool holder 20 is shaped to provide required clearances to allow free cutting by the insert 40. Axial holes or channels, not shown, may be provided in the tool holder 20 to direct coolant or an air blast to the cutting end in a manner that is well known in the art.

Figure 6:
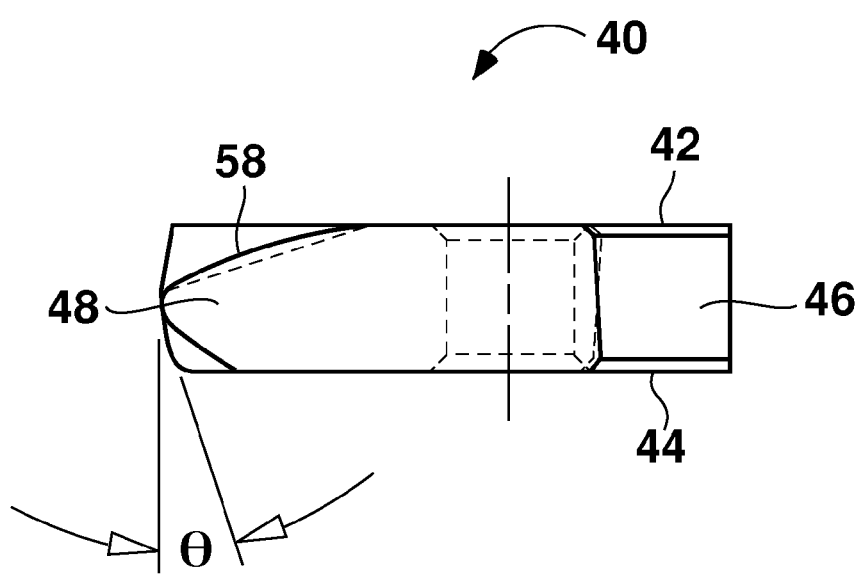
FIG. 6 is a semi-transparent side view of a ball nose end mill insert shown in FIG. 4.
Figure 4:
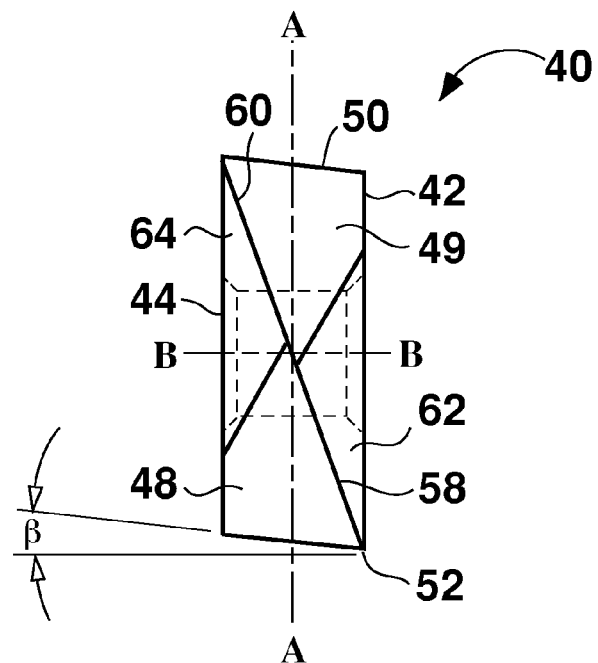
FIG. 4 is a semi-transparent top view of a ball nose end mill insert as used in the embodiment shown in FIG. 1.
Figure 5:
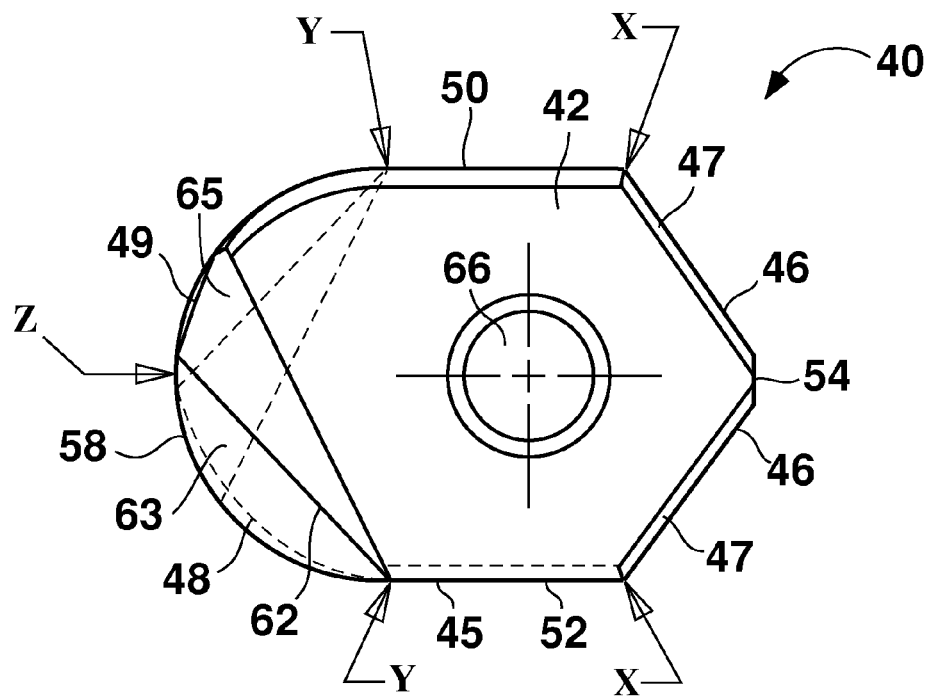
FIG. 5 is a semi-transparent front view of a ball nose end mill insert shown in FIG. 4.
Figure 7:
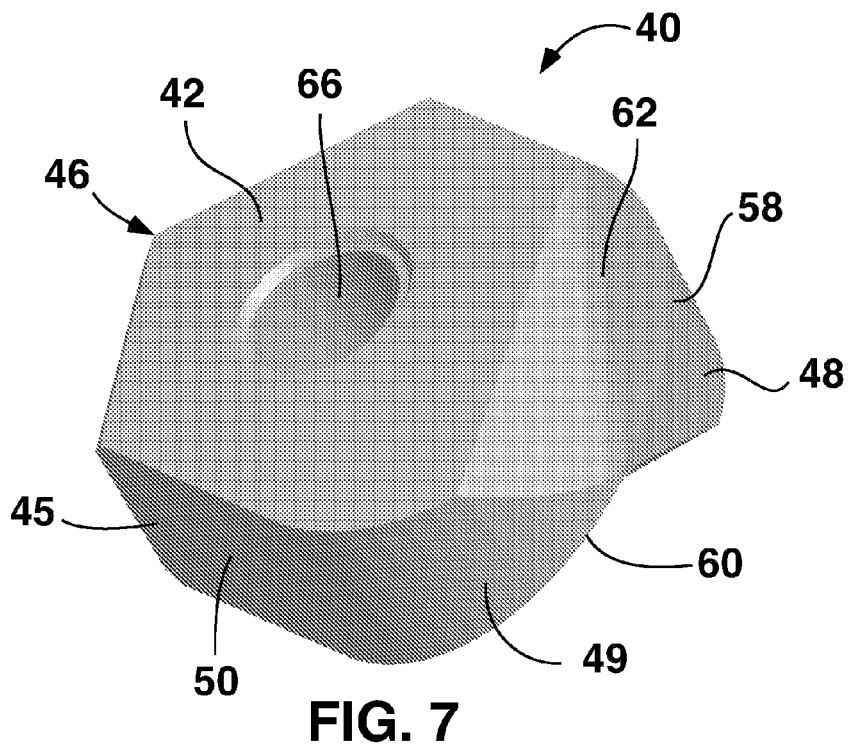
FIG. 7 is a solid perspective rendering of the ball nose end mill insert shown in FIG. 4.
Figure 8:
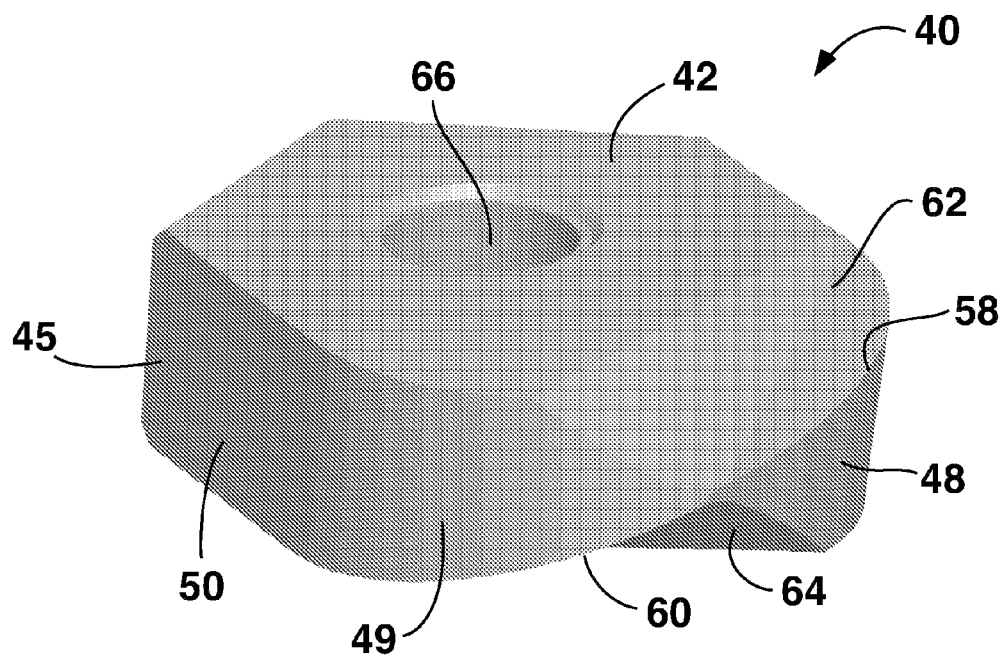
FIG. 8 is an additional solid perspective rendering of the ball nose end mill insert shown in FIG. 4, shown slightly rotated in position relative to FIG. 8.
Figure 9:
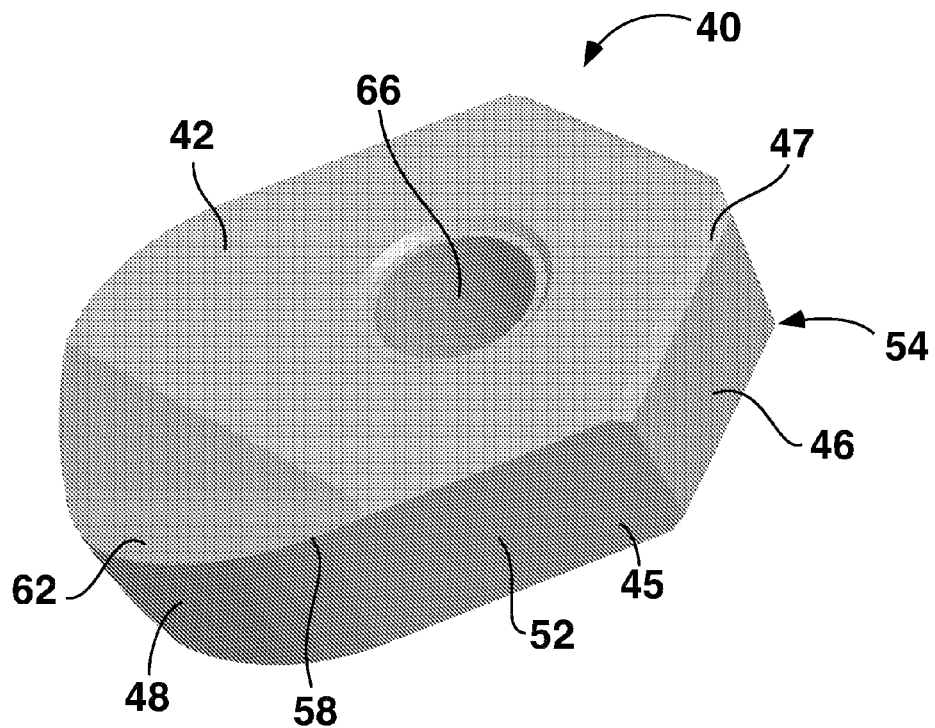
FIG. 9 is an additional solid perspective rendering of the ball nose end mill insert shown in FIG. 4.
Figure 10:
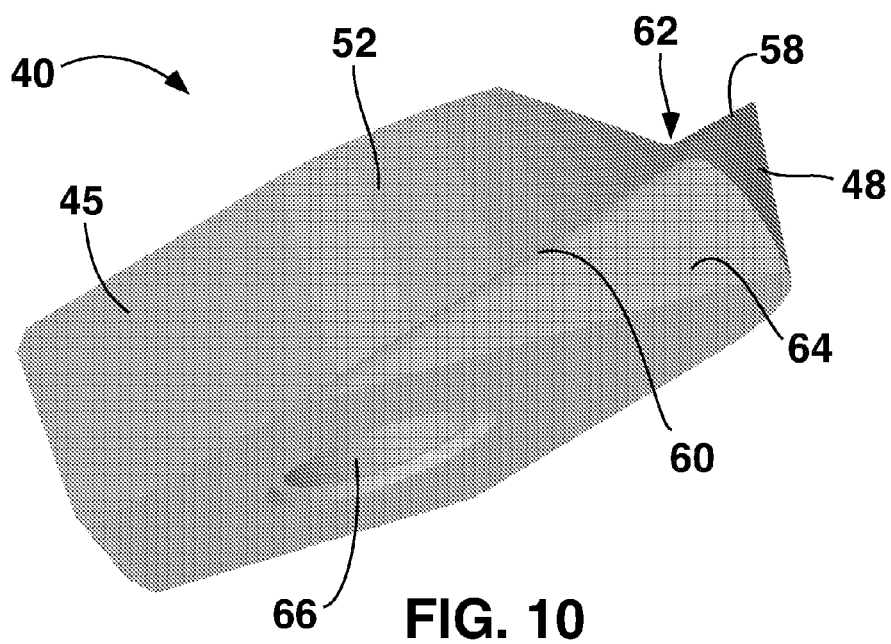
FIG. 10 is an additional solid perspective rendering of the ball nose end mill insert shown in FIG. 4.
Figure 11:
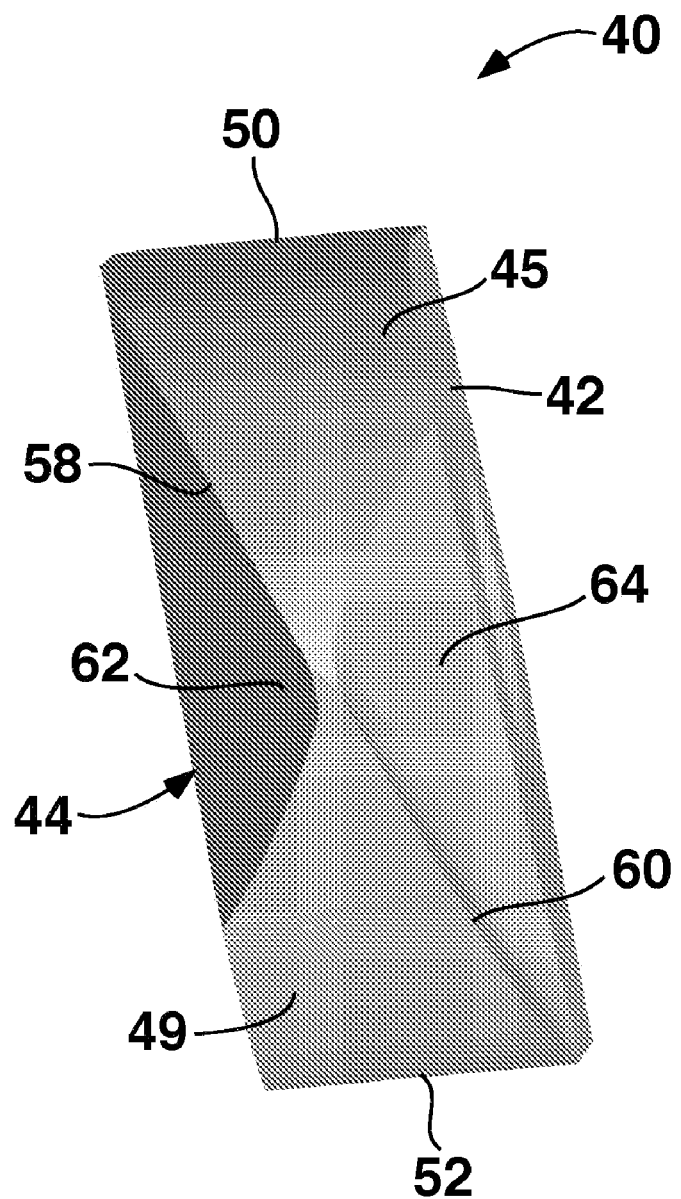
FIG. 11 is an additional solid perspective rendering of the ball nose end mill insert shown in FIG. 4, showing an end of the insert.

FIGS. 4 through 6 are semi-transparent views and FIGS. 7 through 11 are solid views of the replaceable, throwaway cutting tool insert 40. Insert 40 includes opposed substantially flat retention surfaces 42 and 44, and a peripheral surface 45 joining the retention surfaces. The retention surfaces 42 and 44 are adapted to engage side surfaces of the axial slot 22 in the forward portion 28 of the tool holder 20 when the sides surfaces are drawn together by the screw 30 to securely contact the cutting insert 40 and thereby positively retain the insert 40 in position on the tool holder 20. The peripheral surface 45 includes a substantially V-shaped axial locating surface 46 at one end of the insert 40, and arcuate surfaces 48 and 49 at an opposed end of the insert 40. Locating surface 46 is preferably perpendicular to the retention surfaces 42 and 44. A flat surface 54 may be located at the center of the V-shaped axial locating surface 46 so that positioning of the insert 40 on the corresponding V-shaped locating surface 32 of the tool holder 20 is primarily determined by the sides of the locating surfaces and allow for greater accuracy. As shown in FIG. 9, the angled surfaces of the axial locating surface 46 may include chamfered edges 47 to prevent chipping.

Side surfaces 50 and 52 may be located between locating surface 46 and the arcuate surfaces 48 and 49 in the preferred embodiment.

Side surfaces 50 and 52 are formed with a side clearance angle β, indicated in FIG. 4. Side clearance angle β preferably is a constant angle. Side clearance angle β preferably extends the full length of side surfaces 50 and 52, from the opposing ends of the arcuate surface 48 and 49 (shown as "Y" in FIG. 5) to the outward ends of the locating surface 46 (shown as "X" in FIG. 5). The size of the side clearance angle 56 may vary with the cutting diameter of the insert and is preferably in the range of 2° to 10°. Side clearance angle 56 is preferably 6.5° for a 0.5" diameter ball nose end mill insert. Side surfaces 50 and 52 may be shortened or eliminated in smaller size inserts.

Arcuate surfaces 48 and 49 extend rearwardly from approximately the axial center of the cutting end of the insert 40 and are positioned on opposite sides of the insert symmetrically with respect to the centerline of the insert. Arcuate surfaces 48 and 49 include cutting edges 58 and 60 which extend from approximately the axial center of the cutting end of the insert 40 to the side surfaces 52 and 50 respectively on opposite sides of the cutting insert 40. The cutting edges 58 and 60 are formed at the intersections of arcuate surfaces 48 and 49 with the outward portions 63 of chip control grooves 62 and 64 formed in the retention surfaces on opposite sides of insert 40. Chip control grooves 62 and 64 assist in breaking chips formed during the machining operation.

Chip control grooves 62 and 64 are formed in retention surfaces 42 and 44 at an angle defined by the bottom of the grooves. The bottoms of the chip control grooves 62 and 64 preferably extend from a point on the retention surfaces 42 and 44 (shown as "Y" in FIG. 5) at or near the ends of the arcuate cutting surfaces 48 and 49 to a point at or near the axial center of the cutting end of insert 40 (shown as "Z" in FIG. 5). Preferably the ends of the bottoms of the chip control grooves 62 and 64 nearest the axial center of cutting end of insert 40 are located a short distance from the axial center, both vertically and horizontally, to provide a slightly thicker section at the axial center of the insert which strengthens the insert at that point. The distance between the bottoms of chip control grooves 62 and 64 nearest the axial center of cutting end of insert 40 and the vertical centerline of insert 40 (shown as A in FIG. 4) preferably does not exceed 5% of the width of the insert. The width of the insert is the distance from "Y" to "Y" as seen in FIG. 5. That distance is preferably about 0.008" for a 0.5" diameter ball nose end mill insert. The distance between the bottoms of chip control grooves 62 and 64 nearest the axial center of cutting end of cutting insert 40 and the horizontal centerline of cutting insert 40 (shown as B in FIG. 4) preferably does not exceed 10% of the width of the insert. That distance is preferably about 0.016" for a 0.5" diameter ball nose end mill insert.

The chip control grooves 62 and 64 are preferably formed with planar side walls 63 and 65. The angle between side walls 63 and 65 will preferably be in the range of 80° to 150° and is preferably 131.5° for a 0.5" ball nose end mill insert. The bottoms of chip control grooves 62 and 64 are preferably formed as a small radius, typically 0.05", to provide strength. The outer side walls 63 of chip control grooves 62 and 64 may also be slightly concave to provide somewhat sharper cutting edges and assist in curling and breaking the machined chips.

Arcuate surfaces 48 and 49 are formed with a face clearance angle under cutting edges 58 and 60. An example of the face clearance angle is indicated generally as "Ø" in FIG. 10. As depicted in the embodiment shown in the appended figures, and with particular reference to FIG. 5, the face clearance angle Ø preferably progressively increases from one value at a point "Y" at or near the ends of the arcuate surfaces 48 and 49 to a greater value at a position "Z" at the axial center of the cutting end of the cutting insert 40. The size of the face clearance angle Ø will vary with the cutting diameter of the ball nose end mill and preferably increases from an angle in the range of 2° to 10° at a position "Y" to an angle in the range of 5° to 20° at position "Z". Preferably, the face clearance angle Ø progressively increases from 6.5° to 10.0° for a 0.5" diameter ball nose end mill.

Arcuate surfaces 48 and 49 are preferably circular with a radius equal to one half the width of the insert 40. The cutting end of the insert 40 may be formed by grinding a circular radiused surface from position "Y" on one side of the insert to position "Y" on the opposite side and then grinding the face clearance angles oriented toward opposite retention surfaces 42 and 42. The chip control grooves 62 and 64 may be ground into the appropriate retention surfaces 42 and 44 before or after the face clearance angles are ground. Arcuate surfaces 48 and 49 may be formed with a radius somewhat larger than one half the width of the insert. The cutting insert may also be formed in a conventional pressing operation and finish ground if necessary.

Insert 40 has a through hole 66 positioned toward the rear of the insert 40 to accommodate the screw 30. The hole 66 is typically chamfered at each end to prevent chipping.

Insert 40 is preferably made of a whisker reinforced ceramic material, preferably WG-300® whisker reinforced ceramic manufactured by Greenleaf Corporation of Saegertown, Pa. WG-300® whisker reinforced ceramic has a composition generally described in U.S. Pat. No. 4,961,757, the entire disclosure of which is hereby incorporated herein by reference. The cutting tool insert 40 may also be constructed from any of a variety of materials such as, for example, carbide (ground or unground), cermet (carbide/ceramic), cubic boron nitride, ceramic, and polycrystalline diamond, among others. The cutting tool insert 40 may also include a coating. If a coating is used, it may comprise one or more layers of material that may be deposited on the cutting tool insert 40 by any of a variety of known methods. Typical coating materials include TiC, TiCN, TiN, $Al_2O_3$, HfN, and TiAlN, among others.

Ball nose end mills according to the present disclosure have been successfully used to mill both tool steel and a high temperature alloy. Ball nose end mills having the design generally shown in FIGS. 1-11, and wherein the cutting insert was made from WG-300® whisker reinforced ceramic, were mounted in the spindle of a Matsura vertical milling machine and used to perform test cuts at various speeds and feed rates. One such end mill including a constant clearance angle on the arcuate surfaces of the cutting insert successfully rough machined a 3" diameter hole in a 5" square block made of P20 tool steel (hardness of 55 Rc) with no indexes. The end mill was run as a speed of 1,300 surface feet per minute, a feed rate of 0.004 inch per revolution, and a depth of cut of 0.040". The same end mill including an insert made of WG-300® whisker reinforced ceramic and a progressively increasing face clearance angle on the arcuate surface successfully rough machined a spiral facing cut in the end of a rod made of Inconel 718 alloy (hardness of 43 Rc) without significant cutting insert chipping or wear. The spiral facing cut was machined at a speed of 1,100 surface feet per minute, which is over five times faster than the speed achieved with a ball nose end mill marketed by Sandvik Coromant using a cemented carbide insert (RA216F-13013S-053 end mill with RA216F-13 30 E-L insert in carbide grade P20A). The experimental end mill removed more than 0.5 cubic inch more metal in less than one-quarter of the time. The Sandvik insert showed excessive chipping and flank wear. The experimental cutter was run at a speed of 1,100 surface feet per minute, a feed rate of 414 inches per minute, and a depth of cut of 0.020". The Sandvik cutter was run at the recommended speed of 200 surface feet per minute, the recommended feed rate of 88 inches per minute, and a depth of cut of 0.020". The chips from machining operations using end mills as described herein were easy to control and handle. It was unexpected that a ball nose end mill with a ceramic insert could perform the tests cuts without excessive wear, chipping, or fracturing.

Although the foregoing description has necessarily presented only a limited number of embodiments, those of ordinary skill in the relevant art will appreciate that various changes in the articles and methods and other details of the examples that have been described and illustrated herein may be made by those skilled in the art, and all such modifications will remain within the principle and scope of the present disclosure as expressed herein and in the appended claims. For example, although the present disclosure has necessarily only presented a limited number of end mill and cutting insert embodiments according to the present disclosure, it will be understood that the present disclosure and associated claims are not so limited. Those having ordinary skill will readily identify additional designs and may design and build additional designs along the lines and within the spirit of the necessarily limited number of embodiments discussed herein. It is understood, therefore, that the present invention is not limited to the particular embodiments disclosed or incorporated herein, but is intended to cover modifications that are within the principle and scope of the invention, as defined by the claims. It will also be appreciated by those skilled in the art that changes could be made to the embodiments above without departing from the broad inventive concept thereof.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments.

It is to be understood that the figures and descriptions of the embodiments have been simplified to illustrate elements that are relevant for a clear understanding of the embodiments, while eliminating, for purposes of clarity, other elements. Because many machining techniques are well known in the art and because they do not facilitate a better understanding of the embodiments, a discussion of such techniques is not provided herein.

What is claimed is:

1. A ball nose end mill for material removal, the end mill comprising
    a cylindrical tool body comprising:
        an axially positioned slot in one end of the tool body, said slot including a locating surface to accurately position a cutting insert mounted in the slot axially and relative to an axial centerline of the tool body; and
        a fastener for attaching a cutting insert in the slot in a desired position axially and relative to the axial centerline of the tool body; and
    a cutting insert comprising:
        a body including two opposed substantially flat retention surfaces, each retention surface including a chip control groove thereon extending from a point at or near an axial center of the body at an angle relative to the axial center of the body; and
        a peripheral surface joining the two retention surfaces, the peripheral surface including a locating surface at a first end thereof and two arcuate surfaces at an opposed, second end thereof extending rearwardly from approximately the axial center of the second end and positioned on opposite sides of the insert symmetrically with respect to the axial center of the insert, the arcuate surfaces each including an arcuate cutting edge at the intersection of an outer portion of a chip control groove and the arcuate surface, the arcuate surfaces being formed with a face clearance angle under the cutting edges.

2. The tool of claim 1, wherein the face clearance angle progressively increases in a direction toward the axial center of the second end.

3. The ball nose end mill of claim 2, wherein the face clearance angle increases from an angle in the range of 2° to 10° to an angle in the range of 5° to 20°.

4. The ball nose end mill of claim 2, wherein the face clearance angle increases from an angle of 6.5° to an angle of 10° for a 0.5" diameter end mill.

5. The ball nose end mill of claim 1, wherein each chip control groove is defined by an inner side wall and an outer side wall, and an included angle between said inner and outer side walls is in the range of 80° to 150°.

6. The ball nose end mill of claim 5, wherein the included angle between the inner and outer side walls defining each chip control groove is in the range of 131.5° for a 0.5" diameter end mill.

7. The ball nose end mill of claim 1, wherein the peripheral surface includes side surfaces located between the locating surface and the arcuate surface on opposite sides of the cutting insert body, wherein each side surface defines a side clearance angle.

8. The ball nose end mill of claim 7, wherein the side clearance angle is in the range of 2° to 10°.

9. The ball nose end mill of claim 8, wherein the side clearance angle is 6.5° and the ball nose end mill is a 0.5" diameter end mill.

10. The ball nose end mill of claim 2, wherein the peripheral surface includes side surfaces located between the locating surface and the arcuate surfaces on opposite sides of the cutting insert body, each side surface defining a side clearance angle.

11. The ball nose end mill of claim 10, wherein the side clearance angle is in the range of 2° to 10°.

12. The ball nose end mill of claim 11, wherein the side clearance angle is 6.5° for a 0.5" diameter end mill.

13. The ball nose end mill of claim 1, wherein the cutting insert is fabricated of at least one material selected from the group consisting of carbide, cemented carbide, cermet, cubic boron nitride, polycrystalline diamond, and ceramic.

14. The ball nose end mill of claim 13, wherein the cutting insert is fabricated of a whisker reinforced ceramic material.

15. The ball nose end mill of claim 13, wherein the whisker reinforced ceramic material is WG-300® ceramic.

16. The ball nose end mill of claim 1, wherein the cutting insert further comprises a coating formed on at least one surface thereof.

17. The ball nose end mill of claim 16, wherein the coating comprises at least one material selected from the group consisting of TiC, TiCN, TiN, $Al_2O_3$, HfN, and TiAlN.

18. The ball nose end mill of claim 2, wherein the cutting insert is fabricated of at least one material selected from the group consisting of carbide, cemented carbide, cermet, cubic boron nitride, polycrystalline diamond, and ceramic.

19. The ball nose end mill of claim 18, wherein the cutting insert is fabricated of a whisker reinforced ceramic material.

20. The ball nose end mill of claim 19, wherein the whisker reinforced ceramic material is WG-300® ceramic.

21. The ball nose end mill of claim 18, wherein the cutting insert further comprises a coating formed on at least one surface thereof.

22. The ball nose end mill of claim 21, wherein said coating comprises at least one material selected from the group consisting of TiC, TiCN, TiN, $Al_2O_3$, HfN, and TiAlN.

23. A cutting insert for a ball nose end mill comprising:
    a body including two opposed substantially flat retention surfaces, each retention surface including a chip control groove thereon extending from a point at or near an axial center of the body at an angle relative to the axial center of the body; and
    a peripheral surface joining the two retention surfaces, the peripheral surface including a locating surface at a first end thereof and two arcuate surfaces at an opposed, second end thereof extending rearwardly from approximately an axial center of the second end and positioned on opposite sides of the cutting insert symmetrically with respect to a centerline of the cutting insert, the arcuate surfaces each including an arcuate cutting edge at the intersection of an outer portion of a chip control groove and the arcuate surface, the arcuate surfaces being formed with a face clearance angle under the cutting edges.

24. The cutting insert of claim 23, wherein the face clearance angle progressively increases in a direction toward the axial center of the second end.

25. The cutting insert of claim 24, wherein the face clearance angle increases from an angle in the range of 2° to 10° to an angle in the range of 5° to 20°.

26. The cutting insert of claim 24, wherein the face clearance angle increases from an angle of 6.5° to an angle of 10° for a 0.5" diameter end mill.

27. The cutting insert of claim 23, wherein each chip control groove is defined by an inner side wall and an outer side wall, and an included angle between said inner and outer side walls is in the range of 80° to 150°.

28. The cutting insert of claim 27, wherein the included angle between the inner and outer side walls defining each chip control groove is in the range of 131.5° for a 0.5" diameter end mill.

29. The cutting insert of claim 23, wherein the peripheral surface includes side surfaces located between the locating surface and the arcuate surfaces on opposite sides of the cutting insert body, wherein each side surface defines a side clearance angle.

30. The cutting insert of claim 29, wherein the side clearance angle is in the range of 2° to 10°.

31. The cutting insert of claim 30, wherein the side clearance angle is 6.5° and the ball nose end mill is a 0.5" diameter end mill.

32. The cutting insert of claim 24, wherein the peripheral surface includes side surfaces located between the locating surface and the arcuate surfaces on opposite sides of the cutting insert body, each side surface defining a side clearance angle.

33. The cutting insert of claim 32, wherein the side clearance angle is in the range of 2° to 10°.

34. The cutting insert of claim 33, wherein the side clearance angle is 6.5° for a 0.5" diameter end mill.

35. The cutting insert of claim 23, wherein the cutting insert is fabricated of at least one material selected from the group consisting of carbide, cemented carbide, cermet, cubic boron nitride, polycrystalline diamond, and ceramic.

36. The cutting insert of claim 35, wherein the cutting insert is fabricated of a whisker reinforced ceramic material.

37. The cutting insert of claim 35, wherein the whisker reinforced ceramic material is WG-300® ceramic.

38. The cutting insert of claim 23, wherein the cutting insert further comprises a coating formed on at least one surface thereof.

39. The cutting insert of claim 38, wherein the coating comprises at least one material selected from the group consisting of TiC, TiCN, TiN, Al$_2$O$_3$, HfN, and TiAlN.

40. The cutting insert of claim 24, wherein the cutting insert is fabricated of at least one material selected from the group consisting of carbide, cemented carbide, cermet, cubic boron nitride, polycrystalline diamond, and ceramic.

41. The cutting insert of claim 40, wherein the cutting insert is fabricated of a whisker reinforced ceramic material.

42. The cutting insert of claim 41, wherein the whisker reinforced ceramic material is WG-300® ceramic.

43. The cutting insert of claim 40, wherein the cutting insert further comprises a coating formed on at least one surface thereof.

44. The cutting insert of claim 43, wherein said coating comprises at least one material selected from the group consisting of TiC, TiCN, TiN, Al$_2$O$_3$, HfN, and TiAlN.

45. The cutting insert of claim 23, wherein bottoms of the chip control grooves nearest the axial center of the second end of the cutting insert are spaced from a vertical centerline of the cutting insert by an amount that does not exceed 5% of the width of the cutting insert.

46. The cutting insert of claim 45, wherein the bottoms of the chip control grooves nearest the axial center of the second end of the cutting insert are spaced from the vertical centerline of the cutting insert by about 0.008" and the cutting insert has an effective cutting diameter of 0.5".

47. The cutting insert of claim 24, wherein bottoms of the chip control grooves nearest the axial center of the second end of the cutting insert are spaced from a vertical centerline of the insert by an amount that does not exceed 5% of the width of the cutting insert.

48. The cutting insert of claim 47, wherein the bottoms of the chip control grooves nearest the axial center of the second end of the cutting insert are spaced from the vertical centerline of the cutting insert by about 0.008" and the cutting insert has an effective cutting diameter of 0.5".

49. The cutting insert of claim 23, wherein bottoms of the chip control grooves nearest the axial center of the second end of the cutting insert are spaced from a horizontal centerline of the cutting insert by an amount that does not exceed 10% of the width of the cutting insert.

50. The cutting insert of claim 49, wherein the bottoms of the chip control grooves nearest the axial center of the second end of the cutting insert are spaced from the horizontal centerline of the cutting insert by about 0.016" and the cutting insert has an effective cutting diameter of 0.5".

51. The cutting insert of claim 24, wherein bottoms of the chip control grooves nearest the axial center of a cutting end of the insert are spaced from a horizontal centerline of the cutting insert by an amount that does not exceed 10% of the width of the cutting insert.

52. The cutting insert of claim 51, wherein the bottoms of the chip control grooves nearest the axial center of a cutting end of the insert are spaced from the horizontal centerline of the cutting insert by about 0.016" and the cutting insert has an effective cutting diameter of 0.5".

53. The cutting insert of claim 23, wherein bottoms of the chip control grooves nearest the axial center of a cutting end of the insert are spaced from a vertical centerline of the cutting insert by an amount that does not exceed 5% of the width of the cutting insert and the bottoms of the chip control grooves nearest the axial center of the second end of the cutting insert are spaced from a horizontal centerline of the cutting insert by an amount that does not exceed 10% of the width of the cutting insert.

54. The cutting insert of claim 53, wherein the bottoms of the chip control grooves nearest the axial center of the second end of cutting insert are spaced from the vertical centerline of the cutting insert by about 0.008" and the bottoms of the chip control grooves nearest the axial center of the second end of the cutting insert are spaced from the horizontal centerline of the cutting insert by about 0.016" and the cutting insert has an effective cutting diameter of 0.5".

55. The cutting insert of claim 24, wherein bottoms of the chip control grooves nearest the axial center of the second end of the cutting insert are spaced from a vertical centerline of the cutting insert by an amount that does not exceed 5% of the width of the cutting insert and the bottoms of the chip control grooves nearest the axial center of the second end of the cutting insert are spaced from a horizontal centerline of the cutting insert by an amount that does not exceed 10% of the width of the cutting insert.

56. The cutting insert of claim 55, wherein the bottoms of the chip control grooves nearest the axial center of the second end of the cutting insert are spaced from the vertical centerline of the cutting insert by about 0.008" and the bottoms of the chip control grooves nearest the axial center of the second end of the cutting insert are spaced from the horizontal centerline of the cutting insert by about 0.016" and the cutting insert has an effective cutting diameter of 0.5".

* * * * *